J. F. F. WILLETTE.
ASPIRATOR FOR SURGICAL USE.
APPLICATION FILED OCT. 11, 1918.

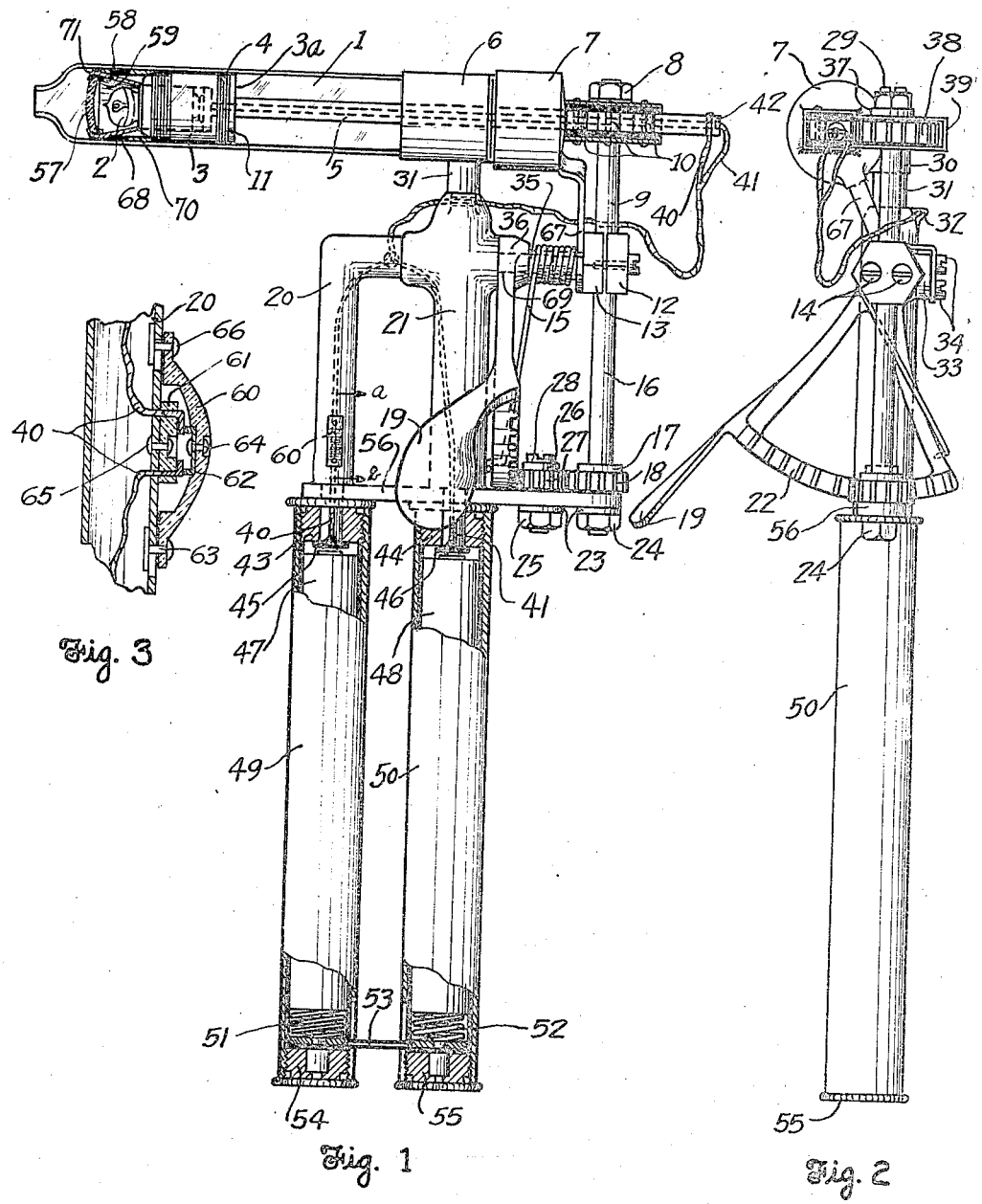

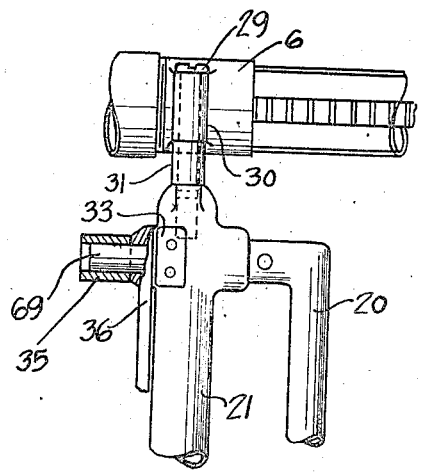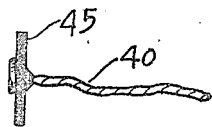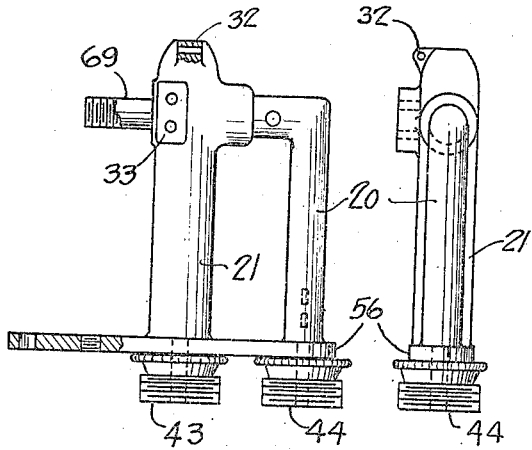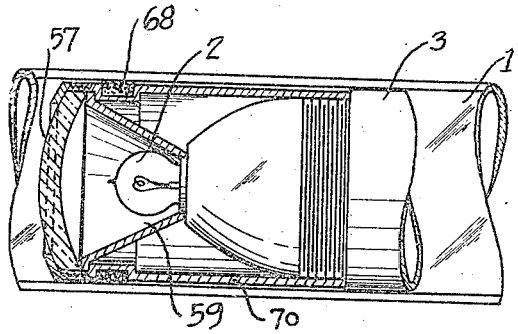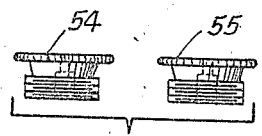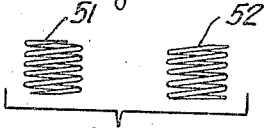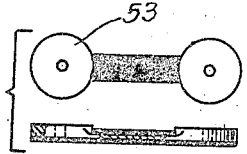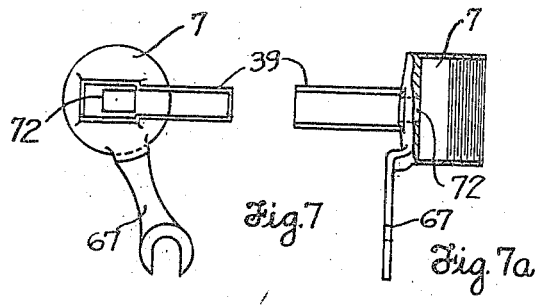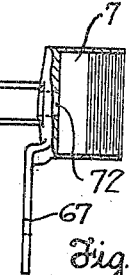

1,299,081.

Patented Apr. 1, 1919.

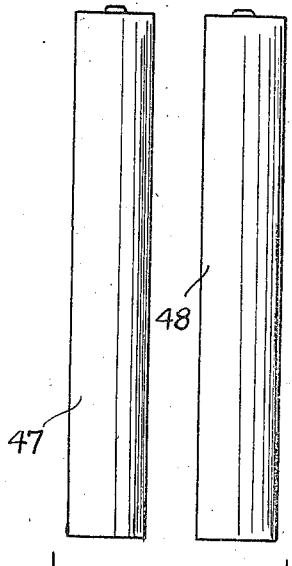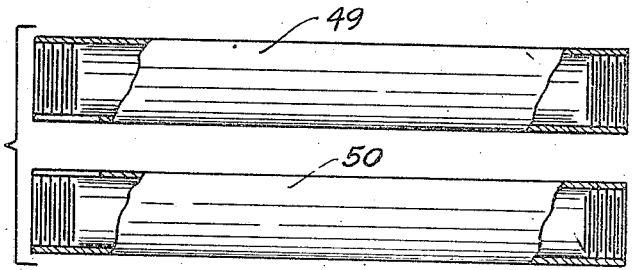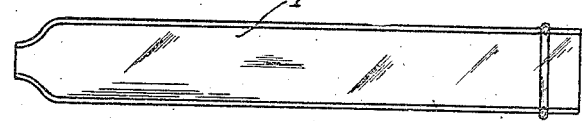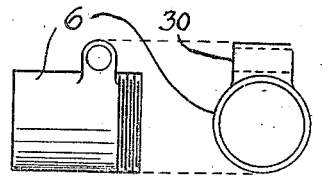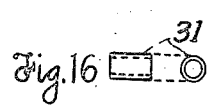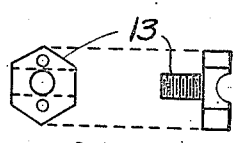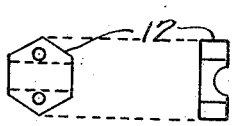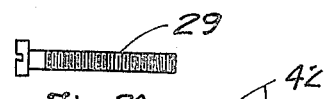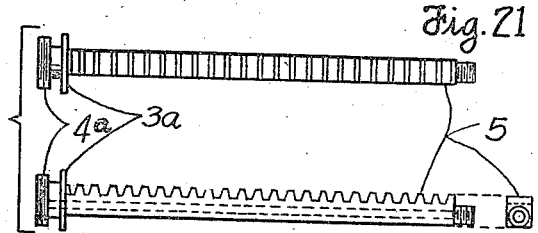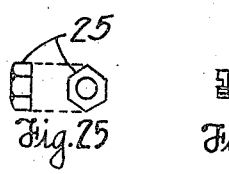

UNITED STATES PATENT OFFICE.

JOSEPH FRANCIS F. WILLETTE, OF SEATTLE, WASHINGTON.

ASPIRATOR FOR SURGICAL USE.

1,299,081.   Specification of Letters Patent.   Patented Apr. 1, 1919.

Application filed October 11, 1918. Serial No. 257,693.

*To all whom it may concern:*

Be it known that I, JOSEPH FRANCIS F. WILLETTE, a citizen of the United States, residing at Seattle, in the county of King, State of Washington, have invented a new and useful Aspirator for Surgical Use, of which the following is a full, clear, and exact description, such as will enable others skilled in the art to which it appertains to make and use the same.

The intended purpose of my device is to draw the products of suppuration, or other unwholesome matter from wounds, sores, or body orifices, to apply medicament and to illuminate the parts under treatment.

In its general aspect my invention comprises the combination of a pump like device having within the chamber a radiating device adapted to direct rays toward the chamber orifice. The radiations may be therapeutic in character, or heat, light or electricity.

My invention also comprises improvements in the aspirator independent of its illuminating or other radiating element, as well as in the means for illuminating or treating with rays.

More specifically my invention comprises a cylinder, translucent in whole or part, having a nozzle at one end, and inclosing a piston and electric light bulb, whereby the device may illuminate any part to be treated and fluid substances be drawn into the cylinder therefrom or ejected from the cylinder thereto. The device is adapted to be manipulated by one hand of the surgeon or medical attendant using it leaving the other hand free for other duty. The means for controlling the light and the means for operating the piston are conveniently located where they may be manipulated by the hand that grasps the device. Any regulated stroke desired can be imparted to the piston. The impediments of separate lamps or lanterns, in those situations where lights are dangerous in disclosing locations to the enemy on the battle front or annoying to adjacent restless and nervous persons, may be dispensed with.

Figure 8:
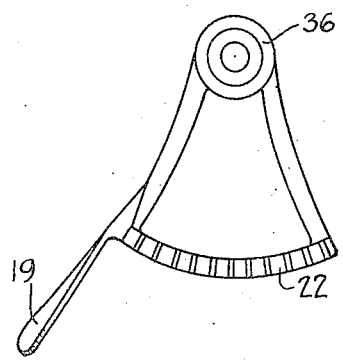
Figure 9:
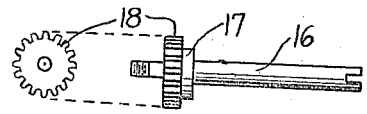
Figure 9A:
Figure 8A:
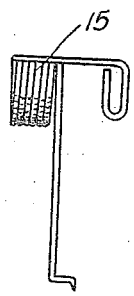
Figure 10:
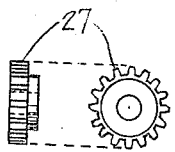
Figure 11:
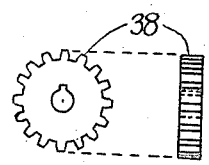

I have illustrated my device in the accompanying drawings in which Figure 1 is a left side elevation of my improved device partly in section with the piston at the end of its outward stroke; Fig. 2 is a rear elevation; Fig. 3 is a section on the line $a$—$b$ of Fig. 1 showing the light switch; Fig. 4 is a right elevation partly in section of a fragment; Fig. 5 is a right elevation of a fragment in section; Fig. 5$^a$ is a rear elevation of the part showing in Fig. 5; Fig. 5$^b$ is a conductor terminal for contact with battery terminal; Fig. 6 is an enlarged side elevation partly in section of the glass cylinder and inclosed piston showing the electric bulb or lamp, reflector, glass lens, and flanged holder, sanitary rubber piston packing, and socketed piston; Fig. 7 is an end elevation of the combined insulated cylinder-head, gear case and piston rod guide; Fig. 7$^a$ is a side elevation, partly in section, of the part shown in Fig. 7; Fig. 8 is an elevation of the lever and segment for operating the piston by pressure of the thumb; Fig. 8$^a$ is a spring for returning the thumb lever; Fig. 9 is one section of a two-part shaft and an attached gear for operating the piston rod; Fig. 9$^a$ is the other section of the two-part shaft; Figs. 10 to 30, inclusive are details of the assemblage.

The aspirator comprises a receiving and discharging cylinder 1, of glass, having a contracted orifice at one end and a cap 7 at the other end. Within the cylinder is fitted a piston comprising a member 3 to which is secured a casing 70, nicely fitting the cylinder 1, and provided with a circumferential groove 58, forming a seat for a sanitary rubber packing 68. The forward end of the piston is formed by a lens 57, which is secured to the casing 70. Secured to the piston is an electric light bulb 2, surrounded by a flaring reflector 59, held between the forward end of the member to which the bulb is secured and the outer edge of the lens, the flanged ring 71, serving to hold the lens and reflector firmly in position. The piston rod 5, is provided in one side with rack teeth and has at one end a screw threaded head 4$^a$ engaging with thread 4, on the piston member 3, and adjacent the head a flange 3$^a$ between which and the member 3 is confined a piston packing 11. The piston rod 5 has a lengthwise bore or channel for the lamp wire 40 and 41 leading to the lamp from batteries hereafter described.

A collar 6 surrounds the glass cylinder 1 and serves as a means of connecting it to the supporting frame and handle; a perforated lug 30 projects from one side of the collar 6, and in the perforation of the lug is seated a screw 29, which passes through spacing member 31 into the end of member 21, thus securing the cylinder and member 21 firmly together.

The member 21 is hollow, having a lateral opening near that end to which the collar 6 is connected and an axial opening at the other end. To the member 21 at the lateral opening is connected the hollow elbow 20, one branch of which extends parallel with the member 21. A bearing stud 69 extends from member 21 opposite the junction therewith of elbow 20, and a perforated lug 32 on the member 21 serves as a guide for the lamp conductors, and a lug 33 serves as a base for anchoring one end of a spring 15 to be hereafter described. The hollow elbow 20 is perforated, as shown in Fig. 1, for the passage of the lamp conductors. Adjacent ends of the hollow member 21 and elbow 20 are externally threaded at 43 and 44 respectively and the members are connected by a plate 56 which projects laterally beyond the member 21 and has two perforations in its projecting portion for a purpose hereinafter stated.

Two cylinders 49 and 50 are threaded to the threaded ends of the members 20 and 21. These cylinders serve as handles and also as containers for two dry cells 47 and 48. Plugs 54 and 55 are threaded into the free ends of the handle cylinders 49 and 50 and springs 51 and 52 urge the dry cells toward the opposite ends of the cylinders to force their terminals into good electrical contact with the terminals of the lamp conductors 40 and 41 which enter at the other end. The conductors 40 and 41 extend from the lamp through the piston rod 5, through the lug 32, into the hollow members 20 and 21 and into the cylinders 49 and 50, where contact is made with the cell terminals. Insulating plates 45 and 46 surround the battery-ends of the conductors and provide for proper insulation at those points. A conductor plate 53 connects the batteries electrically between the springs 51, 52 and the plugs 54, 55.

The switch for opening and closing the lamp circuit is shown at Fig. 3. Separate terminals of conductor 40 project through the wall of the hollow member 20 and through an insulating block 61, secured to the exterior of member 20 by a fastener 65. A bridging switch plate 62 is secured by fastener 64 to an insulating sliding finger piece 60 connected to the member 20 by pins 63 and 66 sliding in slots in the wall of said member. By sliding the member 60 with the thumb the lamp circuit may be opened and closed.

Upon the stud 69 is fulcrumed a lever 19. This lever has a perforated boss 36 engaging the stud 69 and a curved rack 22. A spring 15 is coiled around a sleeve 35 on the stud 69. One end of this spring bears upon the lever 19 and the other end is anchored by screws 34, to the base lug 33 on the member 21.

One of the openings on the projecting end of the plate 56, before referred to as joining the members 20 and 21, is screw threaded and the other is plain. In the threaded opening is screwed a shouldered stud 28 which is clamped to the plate by a nut 25 and washer 23, and serves as a stud bearing for a rawhide pinion 26, 27. In the plain opening is journaled the shaft section 16, secured to which is a rawhide pinion 17, 18. A washer 23 and nut 24 coact with this pinion to prevent longitudinal movement of the shaft section 16 in its bearing in the plate 56.

The cylinder cap 7 previously referred to has a guide opening 72 for the piston rod and a casing 39 inclosing a pinion 38, of rawhide, which operates in mesh with the rack teeth on the piston rod 5. The guide and casing are lined with insulating material inasmuch as the conductor wires may come into frictional contact therewith during the reciprocations of the piston. An arm 67 having an open ended slot extends from the cap 7, and the stud 69 engages with the slotted end of the arm.

A half bearing 13 is secured to the end of stud 69 by a threaded projection (shown in Fig. 18) and the half bearing 12 (Fig. 22) mates with the half bearing 13. The rawhide pinion 38 is secured to the shaft section 9, said shaft section having bearing in the side of the casing 39, and having a washer 37 and nut 8 on its extremity outside of the casing. Within the bearing members 12 and 13 the ends of the shaft sections 9 and 16 are coupled so as to rotate together but be free to separate longitudinally.

In its normal position the lever 19 is extended, as shown in Fig. 2, by the tension of spring 15. In that position the piston will be at its extreme forward position. Movement of the lever 19 against the tension of the spring will impart to the piston an inward or suction stroke, and the return stroke will be caused by the spring.

It will be seen that the parts described are so organized and related that when the instrument is held in one hand by the handles 49 and 50, the switch slide 60 is in position to be conveniently controlled by the thumb and the lamp may be instantly lighted or extinguished, the switch remaining in the position it is moved to when released from the pressure of the thumb. The device is thus susceptible of manipulation by one hand to perform instantly its function.

The cylinder 1 with its contained parts, and its associated gear 38 and shaft section 9, may be detached from the supporting member 21 by removing the screw 29. This facilitates sterilization.

By having the electric light bulb in the piston, I obtain several advantages besides the consolidation of the functions of illumination, and the moving of fluids. I can gage the position and intensity of light on the wound to be treated, regulate the temperature of the portion of the instrument that comes in contact with sensitive tissue and direct absolutely the point of the instrument to the proper point, guided by a spot of light which never varies with relation to the working point of the instrument, whatever position the light source may be in. The materials of which the instrument is made (glass, metal, rawhide, and rubber) and its form, render the instrument susceptible of quick and thorough sterilization. Operation of the lever 19 a few times with the nozzle dipped in a disinfecting fluid renders the instrument substantially self sterilizing. The part coming in contact with the body may be quickly separated from the handle, completely submerged in a disinfectant and quickly reassembled. The instrument is particularly useful in military surgery for reasons indicated hereinbefore. The amount of fluids removed or to be injected is readily visible in daylight or darkness owing to the transparency of the cylinder. The device is susceptible of use for radiant treatment of diseased tissue.

I have shown the source of light as an incandescent bulb deriving current from dry cells. It is obvious that any source of electric current may be used, but I find the construction shown most convenient for general use. I contemplate, also, using radio active material as a light source in the piston, in which case its illuminating property may be taken advantage of in connection with its therapeutic properties. Most broadly considered, from the aspect of a combined aspirator and illuminator, I deem any source radiant energy arranged within the aspirator cylinder so as to direct rays to its orifice, within the scope of my invention.

What I claim as new and desire to secure by Letters Patent of the United States is:—

1. A surgical aspirator comprising an orificed chamber, means for drawing fluid thereinto or expelling fluid therefrom, a source of radiant energy within the chamber in position to direct rays to the orifice.

2. An aspirator comprising an open ended cylinder, a piston therein, a source of radiation carried by the piston and adapted to direct rays to the open end of the cylinder for the purpose described.

3. An aspirator comprising a cylinder having an open end, a chambered piston therein, a ray pervious wall forming the front of the chamber and piston, a source of radiant energy within the chamber arranged to direct rays toward the open end of the cylinder, substantially as described.

4. A surgical aspirator comprising an open ended cylinder of transparent vitreous material and an illuminating piston adapted to be reciprocated within the cylinder, substantially as described.

5. A surgical aspirator comprising a cylinder open at one end and having an orificed head at the other end, a piston in the cylinder carrying an electric translator, a piston rod sliding through the orificed head, electric conductors mounted in the piston rod and extending therefrom outside of the cylinder head and adapted to be connected to a source of electrical energy.

6. In an aspirator, a cylinder and piston, a supporting handle, at an angle to the cylinder, comprising a pair of hollow members, each adapted to receive a dry cell, a conductor extending between the hollow members adapted to connect the cells at one end, a branched member uniting the cylinder to the hollow handles, an electrical device in the piston, a piston rod, conductors carried by the piston rod and extending through the branched member into position to be electrically connected with the dry cells, a switch in the branched member, a movable piston-operator both in position to be operated by the thumb of one hand grasping the hollow member, and means for transmitting motion from the operator to the piston, substantially as described.

7. An aspirator comprising an aspirating body and a handle providing at an angle therefrom a bolt connecting the handle and aspirating body, a cylinder head having a projecting forked arm, a stud projecting from the handle engaging the forked arm, a shaft and connections for operating the aspirator, a bearing connected to the stud on which the said shaft rotates and from which it is freely removable endwise.

8. A cylinder and piston, a handle at an angle to the cylinder, a spring returned thumb lever pivoted to the handle, a shaft substantially parallel with the handle, and consisting of two interclutched sections separable from each other by relative endwise motions, a bearing embracing the shaft at the joint between the sections, means whereby one section of the shaft receives rotary motion from the thumb lever, means whereby the other section of the shaft transmits motion to the piston, an arm extending from the cylinder having a forked end engaging the pivot of the thumb lever, and a single screw connecting the cylinder to the end of the handle, substantially as described.

9. A surgical aspirator comprising an open ended cylinder, a piston therein, a handle extending in a direction at an angle to the cylinder, a thumb lever fulcrumed on the handle, a toothed rack on the lever, a shaft and gearing oscillated by the rack, a piston rod connected to the piston, rack teeth on the piston rod, and a gear on the shaft engaging the rack teeth in the piston rod, substantially as described.

10. In a surgical instrument an elongated chamber having an opening adapted to be directed toward a wound or sore, a radiating means within the chamber to direct rays from the opening, a handle at an angle to the long axis of the chamber, a source of energy adapted to energize the radiating means and a controller on the handle subject to thumb or finger pressure adapted to control the energy transmission between the source of energy and the radiating means.

11. A surgical instrument comprising a chambered body having a ray outlet adapted to be pressed against a surface, a radiating device within the chamber movable toward and from the ray outlet, ray deviating means movable with the radiating device and arranged to concentrate the rays in a beam directed to the ray outlet, substantially as described.

12. A hollow body inclosing a radiant device, a handle, an operating device in position to be operated by the pressure of the thumb or finger of the hand grasping the handle, and connections between the operating device and the radiant device for adjusting its position within the hollow body, substantially as described.

In testimony whereof I affix my signature.

JOSEPH FRANCIS F. WILLETTE.